Figure 1:
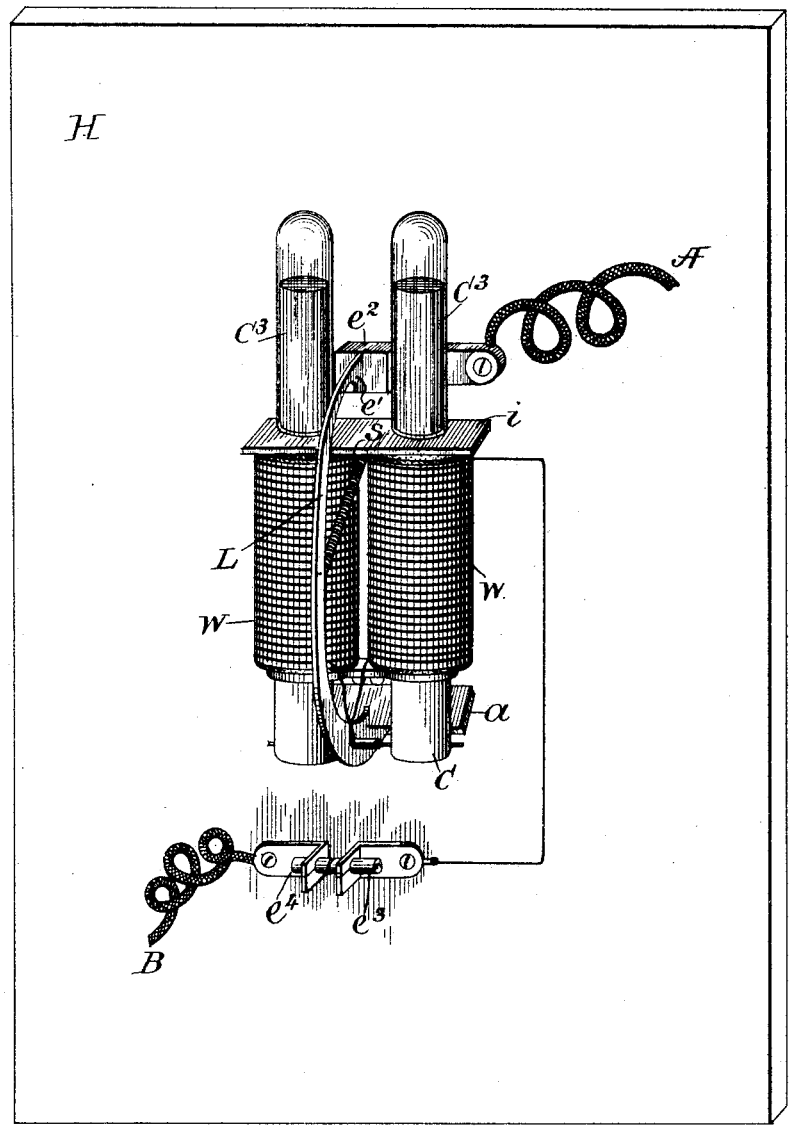

(No Model.) 3 Sheets—Sheet 1.

H. LEMP.
INDUCTION DISCHARGE PROTECTOR FOR WELDING APPARATUS.

No. 473,514. Patented Apr. 26, 1892.

Witnesses

Inventor
Hermann Lemp
By his Attorney (No Model.) 3 Sheets—Sheet 2.
H. LEMP.
INDUCTION DISCHARGE PROTECTOR FOR WELDING APPARATUS.
No. 473,514. Patented Apr. 26, 1892.

WITNESSES:

INVENTOR
Hermann Lemp
BY
H. C. Townsend
ATTORNEY.

(No Model.) 3 Sheets—Sheet 3.

H. LEMP.
INDUCTION DISCHARGE PROTECTOR FOR WELDING APPARATUS.

No. 473,514. Patented Apr. 26, 1892.

WITNESSES:

INVENTOR
*Hermann Lemp*
BY
ATTORNEY.

UNITED STATES PATENT OFFICE.

HERMANN LEMP, OF LYNN, MASSACHUSETTS, ASSIGNOR TO THE THOMSON ELECTRIC WELDING COMPANY, OF MAINE.

INDUCTION-DISCHARGE PROTECTOR FOR WELDING APPARATUS.

SPECIFICATION forming part of Letters Patent No. 473,514, dated April 26, 1892.

Application filed August 14, 1889. Serial No. 320,782. (No model.)

*To all whom it may concern:*

Be it known that I, HERMANN LEMP, a citizen of the United States, and a resident of Lynn, in the county of Essex and State of Massachusetts, have invented a certain new and useful Induction-Discharge Protector for Welding Apparatus, of which the following is a specification.

My invention relates to apparatus designed to protect electric coils from injury by the extra or high-potential induction-discharge current developed in them by interruption of the current in the coils themselves in a coil or circuit inductively related to them. My invention is, however, designed especially for use in connection with transformers or induction-coils used with electric-welding apparatus and having, as is well understood in the art, a primary circuit or coil of much higher potential than the secondary, the latter being adapted to develop a current whose electromotive force ordinarily is much less than that required to maintain an arc. In this class of apparatus it is particularly necessary to provide a means for preventing injury to the primary coil on the sudden interruption of the current in the secondary, since, owing to the low potential of the current in the secondary and its inability to maintain an arc, the interruption to the flow of the secondary current produced by rupture of its conducting path is exceedingly sudden and an extra current of enormous potential is developed in the primary coil.

My invention consists in certain improvements in the construction and organization of an apparatus which is designed to provide a path for such extra or induction-discharge current, and which is also organized to interrupt or put out any electric arc which may tend to follow across the contacts or electrodes of the protective devices immediately after the passage of the discharge-current.

The apparatus in which my invention is embodied involves the employment of two electrodes like those of an ordinary lightning-arrester connected, respectively, to the terminals of the primary coil and separated by a very narrow space containing air or a film of any other insulating material.

The apparatus forming my invention also embodies a means for putting out such arc by interrupting the circuit across the electrodes.

The novel combinations and organization of apparatus claimed by me will be first described in connection with the accompanying drawings, and then more specifically stated in the claims.

Figure 2:
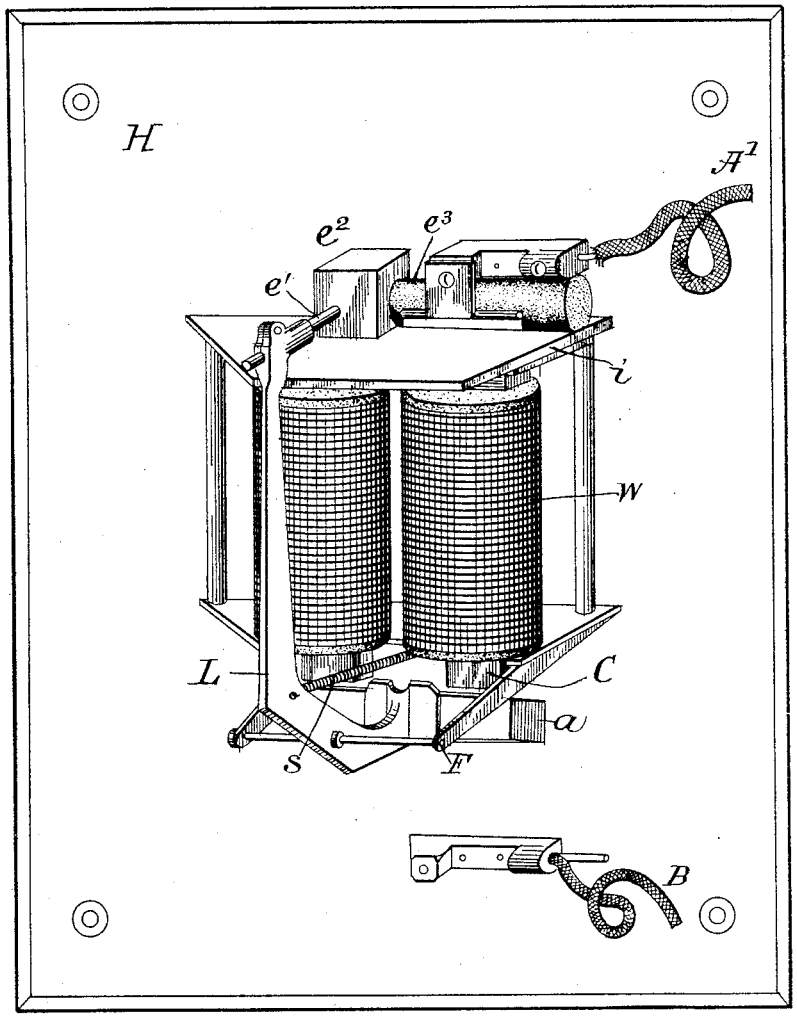
Figure 3:
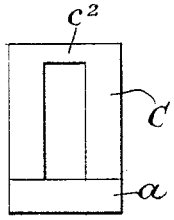
Figure 4:
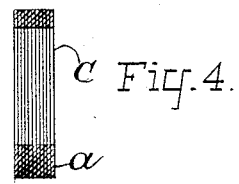
Figure 3:
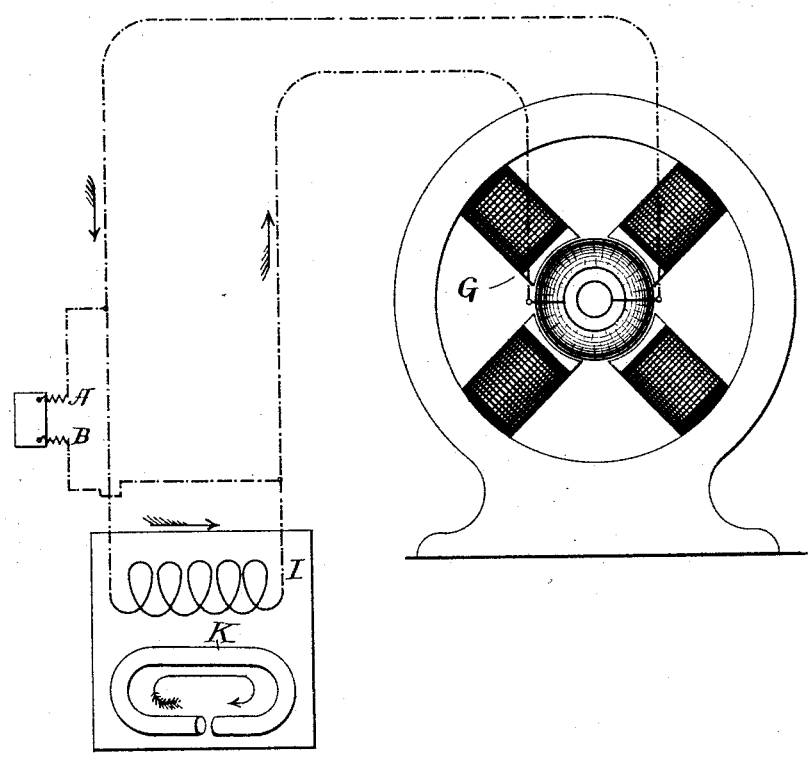

In the accompanying drawings, Figure 1 is a perspective view of an apparatus embodying my invention. Fig. 2 is a perspective view of a modification. Fig. 3 is an elevation of a part of the core and armature of the electro-magnet. Fig. 4 is a cross-section through the same. Fig. 5 is a diagram of circuits, illustrating the manner of connecting the apparatus to the circuits of a transformer and generator supplying the primary thereof.

The object of my invention is, generally speaking, to provide an organization in which there shall be entire freedom from the continuance of any electric arcs in the protector and which shall be capable of resetting itself after operation.

For the purpose of putting out the arc which may form between the electrodes of the protective device I employ a circuit-breaker carried by the armature-lever of an electro-magnet, and I place the contact of such circuit-breaker in the magnetic field of such magnet or of a magnet in the circuit through the electrodes of the protector. When it is desirable to rupture any arc at the space between the electrodes of the protector or to prevent the lodgment of melted metal thereon by the arc, I locate such space in the disrupting magnetic field of such magnet, as will be hereinafter more fully described.

C indicates two magnet-cores, mounted on a base H, of slate or other suitable insulating material and having projecting poles $C^3$ $C^3$, covered with glass tubes to insulate them against the passage of an electric current over such poles.

L is the lever of a circuit-breaker, the contacts of which are indicated at $e'$ $e^2$. The contact $e^2$, of copper or other suitable material, is in the form of a block and is fastened to plate H, while the contact $e'$ is carried by the lever and is normally held in connection with the first by means of a suitable spring S, applied to such lever. The lever L is suitably mounted on a pivot carried by the cores of the magnets or by other suitable support, and is provided with an armature $a$, which is attracted to the poles of the magnet on the passage of the current through the coils W, and thereby operates the circuit-breaker by moving the contact $e'$ away from the contact $e^2$. A plate of slate, soapstone, or other suitable material $i$ is applied, as shown, to protect the coils W against any arc formed at the contacts $e'$ $e^2$.

At $e^4$ $e^3$ are indicated two electrodes of the protector, consisting of two pieces of copper or other suitable material held a short distance apart at their ends and separated thereat by a narrow air-space or film of some insulating material. These electrodes are properly mounted in pieces of metal or other suitable material secured to the base H. One of them has a wire B connected to it and forms one terminal of the apparatus. The other terminal A of the apparatus connects to the contact $e^2$, as shown. The coils W are in the circuit between the circuit-breaker and the electrode $e^3$, as indicated.

The apparatus is applied to the circuit of a welding-coil, as indicated in Fig. 5, where G indicates an alternating-current generator, I the primary of an induction-coil or transformer, and K the low-resistance and low-potential secondary connected with the work. The terminals A B connect to the circuit, so as to place the electrodes $e^3$ $e^4$ and the other apparatus into a circuit across the terminals of the coil I.

The apparatus is normally in the position indicated in Fig. 1. On the occurrence of any high-potential induction-discharge current produced in the primary I by the interruption of the secondary S or from other cause such discharge-current, instead of flowing across and through the insulation of the coils, will flow through the protector by way of contacts $e^2$ $e'$, coils W, through electrodes $e^3$ $e^4$, and across the space between them and out by terminal B. The high potential of such current permits it to jump the narrow space between $e^3$ $e^4$, which space is, however, sufficient to prevent passage of the ordinary exciting-currents flowing on the circuits from the generator A. The establishment of a circuit or current of however slight duration across the space between $e^3$ $e^4$ establishes a path for the generator-current, and an arc would form and continue to burn thereat were it not for the fact that such current energizes the magnet which attracts the armature $a$ and operates the circuit-breaker so as to stop the flow of current and thereby cause the arc to cease. As soon as the interruption of the circuit takes place at the contacts of the circuit-breaker the magnet loses its power and the spring S restores said circuit-breaker to its original position. Any arc formed at the contacts $e'$ $e^2$ will be immediately dispelled or put out under the influence of the disrupting magnetic lines of force passing from one pole of the magnet to the other and forming the magnetic field, in which the contacts of the circuit-breaker are located, as shown. By this interruption of the arc at contacts $e'$ $e^2$, the current flowing through the coils W of the magnet is interrupted, so that the lever L may be returned to its original position. It is essential that all the metal objects around the arc formed at the circuit-breaker should be insulated, so that no short-circuiting of the arc may take place through the same. It is also desirable that the iron core and armature should be laminated when made up of a bundle of iron wires.

I have found in practice that frequently the space between the electrodes $e^3$ $e^4$ of the protector will fill up with a little melted ball of metal when such electrodes are made of copper. This is due to the momentary arc established between such electrodes. I have, however, succeeded in overcoming this difficulty by locating the electrodes in a disrupting magnetic field, as shown more clearly in Fig. 2. In this modification of my invention a block $e^2$, of copper or other conducting material, performs the double office of block $e^2$ and $e^4$, Fig. 1. On one side its face is separated by an air-space from the electrode $e^3$, forming, in conjunction with $e^2$, the protector-electrodes. The contact $e'$ of the circuit-breaker bears upon another face of the block $e^2$, as shown. Electrode $e^3$ I have found it desirable to make of carbon, in order to guard against, as far as possible, the formation of a connecting-bubble of metal. Such electrode is also, as shown in this figure, mounted so as to be adjustable to and from electrode $e^2$. Contact $e'$ is properly supported on the lever L, so as to be removable therefrom for purposes of renewal. An insulating plate of mica, slate, or other insulating material is interposed, as before, between the coils W and the part where an arc is liable to take place. The parts $e'$ $e^2$ $e^3$ are all located over the electro-magnet W and within the disrupting magnetic field of the same. The core of the magnet itself is made up of a series of plates secured together and each formed, as shown in Fig. 3, of two side pieces connected by a part $c^2$ of lesser width than side pieces, but integral with the same. The part $c^2$ is at the top of the magnet beneath the various contacts and electrodes $e'$ $e^2$ $e^3$. The effect of making the iron magnetic circuit of the coils of less cross-section than the cores themselves is to crowd the magnetic lines of force so that a magnetic field will be created outside of the core and will act upon the arc or arcs formed at the spaces between $e^2$ $e^3$ or $e'$ $e^2$. The armature $a$ of the electro-magnet is also here shown as made up of a series of plates. The lever L is pivoted in extensions from the frame, on which the various parts are supported. Such frame is secured to the block or plate H, preferably made of good insulating material.

The protector described may be applied to the circuit between the generator and the primary at any desired point.

What I claim as my invention is—

1. The combination, with an electro-magnet, of a circuit-breaker actuated by such magnet and having its contacts in the field thereof, and a spring acting in opposition to the pull of the magnet for restoring the circuit-breaker to circuit-closing position after operation of the same for the purpose of interrupting the flow of the current in the circuit of the magnet.

2. The combination, with an electro-magnet, of a movable circuit-breaking contact mounted upon the armature-lever of said magnet and included in the circuit through the coils thereof, a fixed contact located in the arc-disrupting field of the magnet and normally engaged by the first-named contact, and a spring acting on said lever in a direction against the pull of the magnet and in a manner to hold the contacts normally together, as and for the purpose described.

3. The combination, with the induction-coil or converter having a low-resistance secondary and a comparatively high-resistance primary traversed by alternating electric currents, of a branch across the mains supplying said primary, an induction-discharge protector consisting of two electrodes placed in close proximity and normally insulated from one another, located in said branch, an arc-rupturing electro-magnet having its coils located in said branch in circuit with said electrodes, a circuit-breaker controlled by said magnet and also in the branch circuit, said circuit-breaker having its contacts in an arc-disrupting field of the magnet, and a retractor for the magnet's armature, adjusted to respond to the current flowing through the coils and across the space between the electrodes.

4. The combination, substantially as described, of the two arrester-electrodes normally separated by an insulating-space and mounted over one end of an electro-magnet, an armature in the magnetic field at the opposite end of the magnet, and a contact mounted upon the armature-lever thereof and normally making connection with one of said electrodes.

5. The combination, with the electrode $e^2$, of the carbon electrode $e^3$, separated therefrom by a narrow insulating-space, the circuit-breaking contact $e'$, normally resting on the first electrode, and an electro-magnet in the circuit of electrodes $e^2$ $e^3$ for operating the circuit-breaker.

6. The arc-rupturing magnet having its cores connected by an iron mass of less cross-section than the cores themselves, so as to create an exterior magnetic field, as and for the purpose described.

7. The arc-rupturing magnet having its cores built up of plates of iron integral with connecting parts narrower than the parts of the plates making up the core, so as to create a magnetic field outside said connecting part.

8. The combination, with the circuit, of the protector-electrodes of an electro-magnet, a circuit-breaker actuated by such magnet and having its contacts in the field thereof, and a spring for restoring the circuit-breaker to circuit-closing position after operation of the same for the purpose of interrupting the flow of the arc-forming current over the electrodes.

Signed at Lynn, in the county of Essex and State of Massachusetts, this 5th day of August, A. D. 1889.

HERMANN LEMP.

Witnesses:
JOHN TREGONING,
EINAR RASMUSSEN.